United States Patent [19]

Prostler et al.

[11] 3,764,189
[45] Oct. 9, 1973

[54] BEARING FOR PIVOTALLY MOUNTED GUIDE VANES IN THERMAL TURBOMACHINES

[75] Inventors: Wolfgang Prostler; Peter Ferschin; Karl Lechner, all of Munchen, Germany

[73] Assignee: Motoren-und Turbinen-Union Munich GmbH, Munich, Germany

[22] Filed: Dec. 29, 1971

[21] Appl. No.: 213,624

[30] Foreign Application Priority Data
Dec. 29, 1970 Germany.................. P 20 64 318.9

[52] U.S. Cl. ............................................. 308/237
[51] Int. Cl. ............................................ F16c 33/24
[58] Field of Search...................... 308/8, 241, 237

[56] References Cited
UNITED STATES PATENTS

| | | | |
|---|---|---|---|
| 2,253,969 | 8/1941 | Dawihl | 308/8 |
| 2,602,714 | 7/1952 | Wheildon, Jr. | 308/8 |
| 2,980,475 | 4/1961 | Wolfe | 308/8 |
| 3,022,685 | 2/1962 | Armacost | 308/8 |

*Primary Examiner*—Charles J. Myhre
*Assistant Examiner*—Frank Susko
*Attorney*—Paul M. Craig, Jr. et al.

[57] ABSTRACT

A slidable bearing for pivotally mounted guide vanes in thermal turbomachines including a guide vane stem functioning as a positioning shaft and being carried in sliding bushes in the bearing support. The surface of the guide vane stem is faced with a chromium carbide layer while the bushes are preferably formed of a ceramic oxide such as aluminum oxide. With operations under severe thermal shock loads, the bushes may optionally be fabricated from silicon nitride.

13 Claims, 2 Drawing Figures

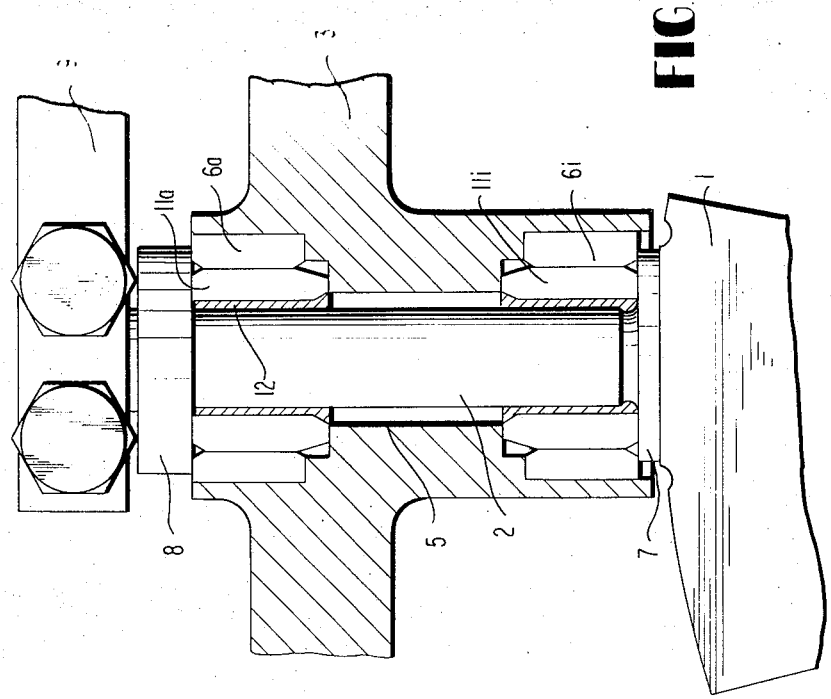
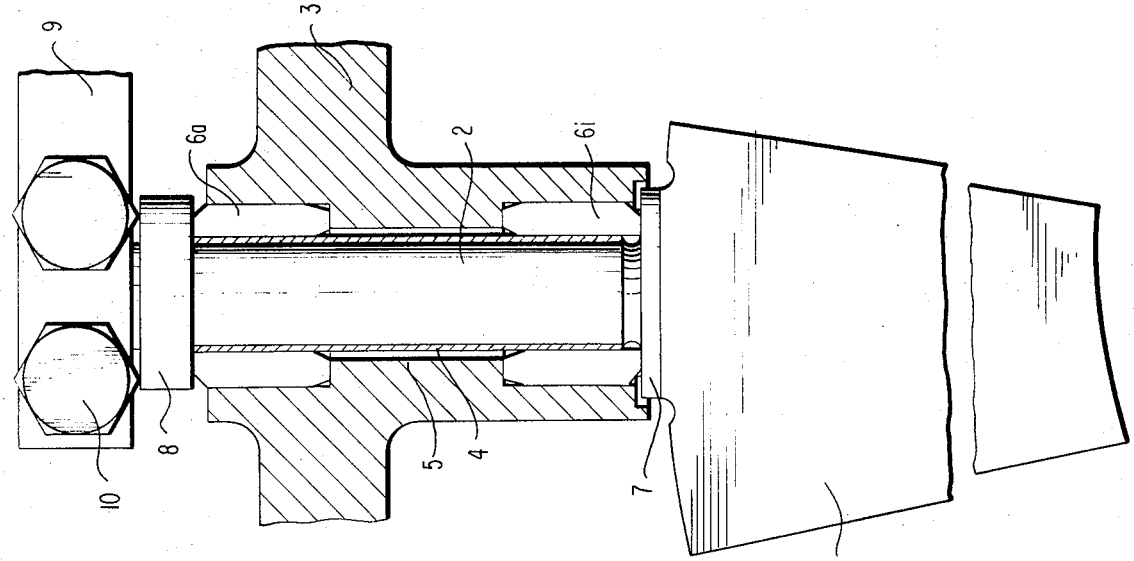

BEARING FOR PIVOTALLY MOUNTED GUIDE VANES IN THERMAL TURBOMACHINES

BACKGROUND OF THE INVENTION

The present invention relates to a non-lubricated bearing operative over large temperature ranges especially at high temperatures under severe stresses. More particularly, the invention is concerned with a slidable bearing for pivotally mounted guide vanes in thermal turbomachines, wherein a guide vane stem serves the function of a positioning shaft and is carried in slidable bushes in a bearing support.

Difficulty is sometimes encountered in bearings for pivotally mounted guide vanes at the extremely high service temperatures (about 1000°C) in thermal turbomachines since, at elevated temperatures, the sliding properties of most materials change and lubricants are no longer practicable. Another inconvenience is that thermal expansion at such temperatures is substantial, reducing bearing clearances and thereby rendering guide vane adjustment practically impossible. Attempts have therefore been made to minimize the heat in such bearing areas by providing complex cooling systems, e.g. air under pressure. These, however, are expensive and require a considerably expanded mechanical design. Further, these systems demand a large volume of air for efficient operation.

SUMMARY OF THE INVENTION

The present invention overcomes the disadvantages of the prior art by providing a slidable bearing for pivotally mounted members, preferably pivotally mounted guide vanes in thermal turbomachines, comprising a bearing support, at least one slidable bush seated in said bearing support constructed of silicon nitride or a ceramic oxide, preferably aluminum oxide, and a shaft carried in said at least one slidable bush, said shaft being faced with a chromium carbide layer. Most advantageously, the chromium carbide layer is deposited on the shaft by flame or plasma spraying.

The invention is further directed to a slidable bearing for pivotally mounted members, such as pivotally mounted guide vanes in thermal turbomachines, comprising a bearing support, at least one outer bush of a ceramic oxide, preferably aluminum oxide, seated in said bearing support, a shaft (guide vane stem serving as a position shaft), and at least one inner bush of a ceramic oxide, preferably aluminum oxide, bonded to said shaft by a highly temperature resistant adhesive and arranged to engage said at least one outer bush.

BRIEF DESCRIPTION OF THE DRAWINGS

These and other features and advantages of the present invention will become apparent from the following detailed description of various embodiments of the invention taken in conjunction with the appended drawings, wherein:

FIG. 1 illustrates a bearing in accordance with one embodiment of the invention wherein a stem is carried in a pair of bushes.

FIG. 2 illustrates a further embodiment of the invention wherein a pair of bushes are bonded to a stem and arranged to slide in a pair of bushes seated in a bearing support.

DETAILED DESCRIPTION OF THE INVENTION

With reference to FIG. 1, a guide vane 1 carried on a vane stem or shaft 2 is pivotally mounted in a bearing support 3. The vane stem 2, which serves as a positioning shaft, is faced with a chromium carbide layer 4. Force fitted into the stepped inner and outer seats of the bearing support 3 are, respectively, a slidable bush 6i and a slidable bush 6a. The vane stem is pivotally mounted in the slidable bushes 6i and 6a which are preferably made of aluminum oxide ($Al_2O_3$). The bearing serves the concomitant functions of radial and axial support in that a stop collar 7 intervening between the stem 2 and the vane 1 bears against the face of slidable bush 6i. A positioning lever 9 is frictionally held against the stem 2 with screws 10 and secures a washer 8 against the face of the outer slidable bush 6a.

It has been demonstrated that, when the guide vane stem is faced with chromium carbide ($CrC_2$) and the bushes are constructed of a ceramic oxide, preferably aluminum oxide ($Al_2O_3$), the guide vane stem of the present invention, taken in conjunction with a steel bearing support, will be adequately adjustable with a minimum amount of clearance at temperatures of about 1000°C, at which temperature the steel bearing support is heated to a red glow, without any need for cooling or lubrication. At these temperatures, the torque expended at the shaft to pivot it is practically the same as in a cold condition. Further, this bearing assembly operates substantially in the absence of any wear.

The chromium carbide layer is most advantageously deposited on the vane stem by flame or plasma spraying employing conventional methods. This offers a maximum bond of the coating with the stem and produces a structure ideally suited for slidable bearings.

Aluminum oxide is preferred as the ceramic oxide material of the bushings by virtue of its ability to withstand great abuse or stresses. However, where severe thermal shock loads are anticipated, the bushes may be comprised of silicon nitride ($Si_3N_4$) instead.

With reference to FIG. 2, bonded by means of a highly temperature resistant adhesive 12 (preferably of the two component type) to a guide vane stem 2 of a guide vane 1 are two preferably aluminum oxide bushes 11i and 11a. The vane stem 2 is carried through bushes 11i and 11a in preferably aluminum oxide bushes 6i and 6a which are force fitted into stepped seats in a bore 5 in a bearing support 3. This bearing likewise serves for simultaneously radial and axial support, using washers 7, 8 and a positioning lever 9 much as in FIG. 1.

Vane stem 2 of this embodiment, like FIG. 1, may be coated with chromium carbide. Also, one or both sets of bushes 6i, 6a and 11i, 11a may be optionally jacketed or made from silicon nitride where severe thermal shock loads are anticipated.

It is understood that the embodiments disclosed herein are susceptible to numerous changes and modifications, as will be apparent to a person skilled in the art. Accordingly, the present invention is not limited to the details shown and described herein but intended to cover any such changes and modifications within the scope of the invention.

We claim:

1. A slidable bearing for pivotally mounted members comprising a bearing support, at least one slidable bush seated in said bearing support, said at least one slidable bush being made of a material selected from the group consisting of a ceramic oxide and silicon nitride, and a shaft carried in said at least one slidable bush, said shaft having a chromium carbide coating thereon.

2. A slidable bearing according to claim 1, wherein said at least one slidable bush is constructed of aluminum oxide.

3. A slidable bearing according to claim 1, wherein said chromium carbide coating is deposited on said shaft by flame or plasma spraying.

4. A slidable bearing according to claim 1, wherein said at least one slidable bush is constructed of silicon nitride.

5. A slidable bearing for pivotally mounted guide vanes in thermal turbomachines comprising a bearing support, slidable bushes seated in said bearing support, said slidable bushes being constructed of one of a ceramic oxide and silicon nitride, and a guide vane stem functioning as a positioning shaft carried in said slidable bushes, said stem being faced with a chromium carbide layer.

6. A slidable bearing according to claim 5, wherein said bushes are constructed of aluminum oxide.

7. A slidable bearing according to claim 1, wherein said bushes are constructed of silicon nitride.

8. A slidable bearing according to claim 1, wherein one end of said shaft is connected to a guide vane of a thermal turbomachine.

9. A slidable bearing according to claim 8, wherein the end of said shaft opposite said one end is connected to a positioning lever such that movement of said positioning lever effects pivotal movement of said shaft and said guide vane.

10. A slidable bearing according to claim 5, wherein one end of said stem is connected to a guide vane of a thermal turbomachine.

11. A slidable bearing according to claim 10, wherein the end of said stem opposite said one end is connected to a positioning lever such that movement of said positioning lever effects pivotal movement of said stem and said guide vane.

12. A slidable bearing according to claim 9, further comprising a washer adjacent said positioning lever and a stop collar at said guide vane, wherein said at least one slidable bush includes a first slidable bush disposed with an end face against said washer and a second slidable bush with an end face against said stop collar.

13. A slidable bearing according to claim 11, further comprising a washer adjacent said positioning lever and a stop collar at said guide vane, wherein said at least one slidable bush includes a first slidable bush disposed with an end face against said washer and a second slidable bush with an end face against said stop collar.

* * * * *